April 16, 1963  J. M. FEITEIRA, JR  3,085,675
FOLDING CONVEYOR
Filed May 22, 1961  2 Sheets-Sheet 1
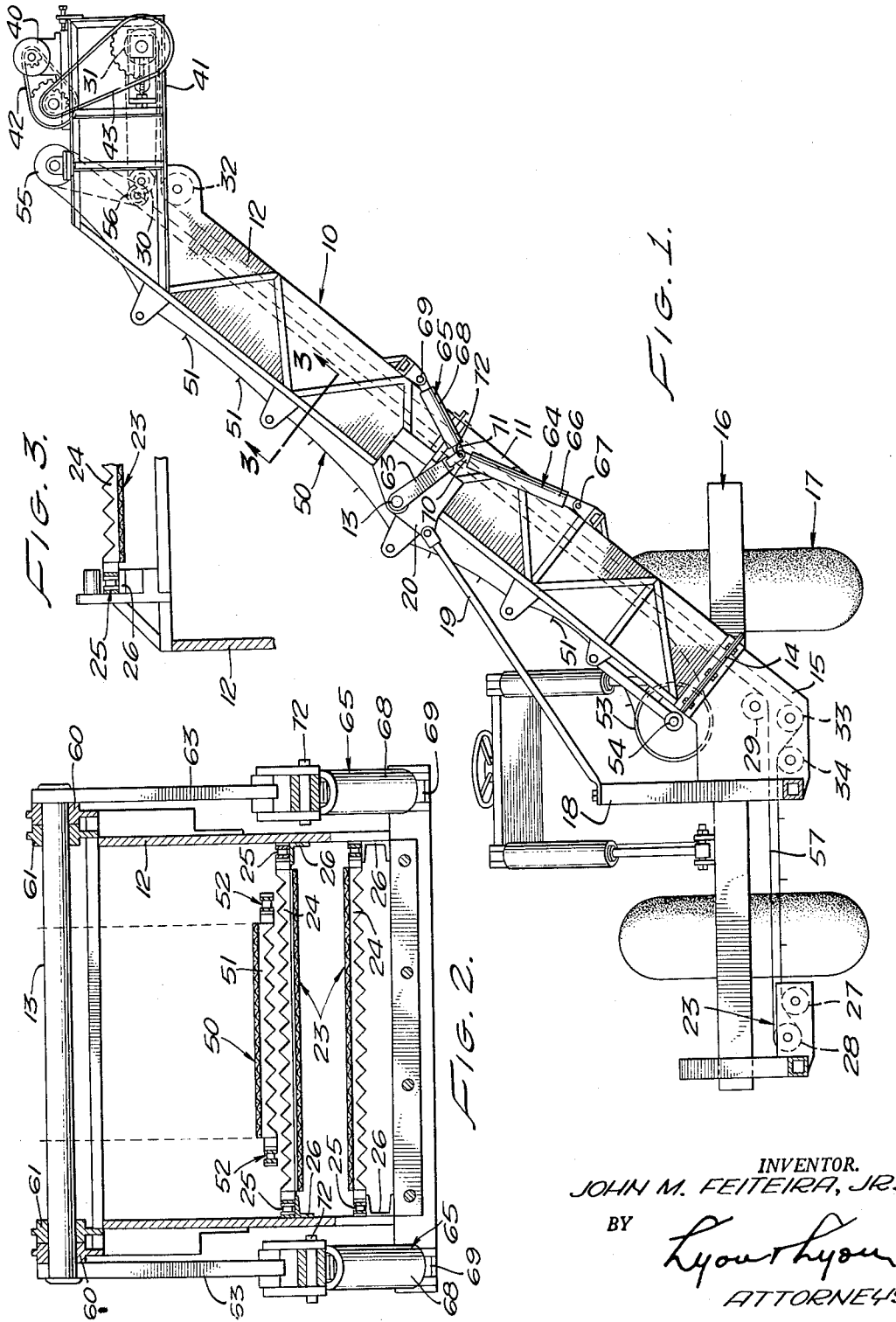
INVENTOR.
JOHN M. FEITEIRA, JR.
BY
Lyon Lyon
ATTORNEYS

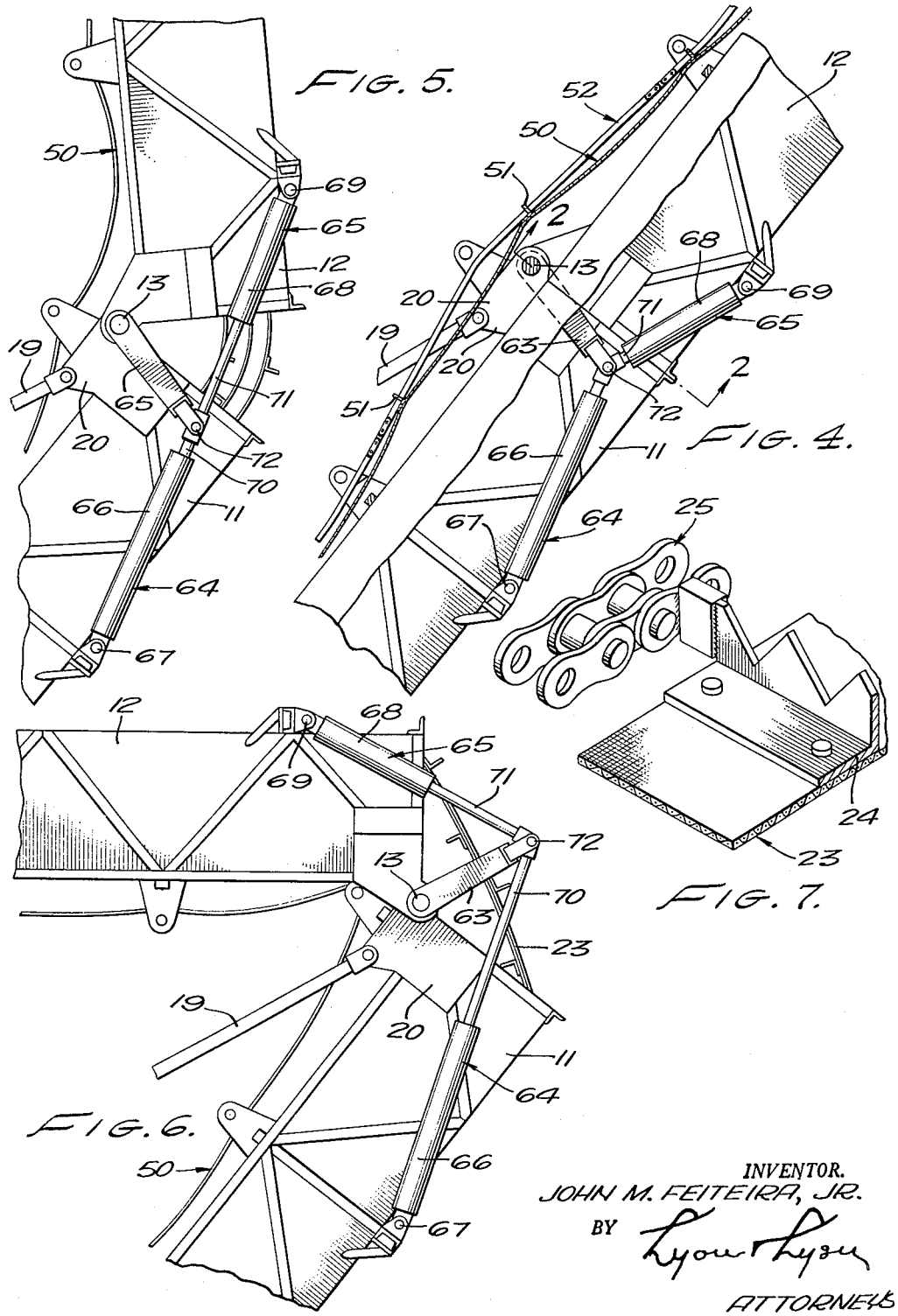

United States Patent Office 3,085,675
Patented Apr. 16, 1963

3,085,675
FOLDING CONVEYOR
John M. Feiteira, Jr., Kailua, Oahu, Hawaii, assignor to Hawaiian Development Company, Ltd., Honolulu, Hawaii, a corporation of Hawaii
Filed May 22, 1961, Ser. No. 111,679
9 Claims. (Cl. 198—113)

This invention relates to conveyors, and is particularly directed to improvements in a folding conveyor for a cane harvesting machine. A device of this type is shown in the co-pending application of Richard A. Duncan, et al., Serial No. 98,361, filed March 27, 1961, for Sugar Cane Harvester. As shown in that application, the conveyor for cut segments of sugar cane extends upward at an angle from the mobile support in a direction at right angles to the direction of travel of the mobile support. The discharge end of the conveyor is positioned at a relatively high elevation in order that the cut cane segments may be discharged into a truck or trailer traveling alongside the harvesting machine. However, this elevating conveyor extends for too great a distance both vertically and horizontally from the harvesting machine to permit easy transportation of the harvesting machine between cane fields. Accordingly, it is the principal object of the present invention to provide a novel form of elevating conveyor which may be folded when desired to bring the upper extending end thereof to an inoperative position and to reduce the horizontal and vertical extension to values within acceptable limits.

Another object is to provide a novel form of folding mechanism for an elevating conveyor.

Other and more detailed objects and advantages will appear hereinafter.

In the drawings:

FIGURE 1 is a front elevation showing a preferred embodiment of this invention.

FIGURE 2 is a sectional view taken substantially on the lines 2—2 as shown in FIGURE 4.

FIGURE 3 is a sectional detail taken substantially on the lines 3—3 as shown in FIGURE 1.

FIGURE 4 is a fragmentary front elevation partly broken away and showing the frame sections of the conveyor assembly in aligned operative position.

FIGURE 5 is a view similar to FIGURE 4 and showing the upper frame section in an intermediate location between operative and inoperative positions, certain parts being omitted for clarity of illustration.

FIGURE 6 is a view similar to FIGURE 4 and showing the upper frame section in horizontal inoperative position, certain parts being omitted for clarity of illustration.

FIGURE 7 is a perspective view showing parts illustrated in FIGURE 3.

Referring to the drawings, the inclined conveyor assembly generally designated at 10 includes a lower frame section 11 and an upper frame section 12 connected end-to-end by means of a pivot shaft 13. The lower frame section 11 is connected by means of bolted flanges 14 to frame parts 15 carried on a mobile frame generally designated 16. This mobile frame 16 is carried by a suitable vehicle such as, for example, a tractor 17. A post 18 fixed on the mobile frame 16 is connected by means of a tension rod 19 to a bracket 20 fixed on the upper end of the lower frame section 11.

An endless conveyor belt 23 is equipped with metal cross plates 24 and these are fixed at opposite ends to links of endless chains 25 which travel along rails 26 provided on the frame sections 11 and 12, and the support members 16. The chains 25 pass over sprockets 27, 28, 29, 30, 31, 32, 33 and 34 in that order. Power for driving the conveyor belt chains 25 is derived from hydraulic motor 40 mounted on the discharge projection 41 at the upper end of the frame section 12. The motor 40 drives the sprocket 31 through endless connections 42 and 43.

An endless hugger belt 50 is similar in construction to the conveyor belt 23 and is provided with cross plates 51 carried by endless chains 52 along the side edges thereof. The chains 52 of the hugger belt assembly pass around sprockets 53 on the floating tail shaft 54 and also pass around sprockets 55 at the upper end of the frame section 12. The hugger belt 50 is driven at the same speed as the conveyor belt 23, and this may conveniently be accomplished by driving the sprockets 55 from the sprockets 30 by means of suitable gearing 56.

In the general plan of operation, segments of sugar cane stalks are deposited on the horizontal portion 57 of the conveyor belt 23 by means of the harvester mechanism, not shown. The conveyor belt 23 moves the segments of sugar cane stalks to the right as viewed in FIGURE 1 and carries them up the inclined portion of the conveyor belt 23 to the upper end of the frame section 12, from which the cane segments are discharged laterally to the right into a truck or trailer, not shown. The hugger belt 50 makes it possible to convey the short segments of sugar cane up the steeply inclined conveyor belt 23 without cane roll-back, and the floating tail shaft accommodates uneven flow of cane segments. The cross plates 24 of the conveyor belt 23 and the cross plates 51 of the hugger belt 50 may be serrated as shown to give better traction against the sugar cane segments being conveyed.

The inclined conveyor assembly 10 extends laterally and vertically to such great distances as to make it impractical to transport the assembled device between cane fields. In order to reduce overall height and width of the inclined conveyor assembly 10, means are provided for folding the upper frame section 12 to an inoperative position over the lower frame section 11, as shown in FIGURE 6. In accordance with this invention, the horizontal pivot shaft 13 extends through aligned bearings 60 provided on the upper frame section 12 and through aligned bearing 61 provided on the lower frame section 11. The pivot shaft 13 thus connects the frame sections 11 and 12 end-to-end. Arms 63 attached to opposite ends of the pivot shaft 13 cooperate with the pivot shaft to form a free-floating yoke.

Hydraulic power means are provided for swinging the upper frame section 12 around the pivot shaft 13. This hydraulic power means includes a first pair of hydraulic cylinder assemblies 64 and a second pair of hydraulic cylinder assemblies 65. The housings 66 of the cylinder assemblies 64 are pivoted at 67 to the lower frame section 11. Similarly, the housings 68 of the upper cylinder assemblies 65 are pivoted at 69 to the upper frame section 12. Piston rods 70 project from each of the housings 66 and piston rods 71 project from each of the housings 68. Each piston rod carries a fitting at its projecting end. A pivot pin 72 is carried on the projecting end of each of the arms 63. Each pivot pin 72 connects the fittings at the end of one piston rod 71 and one piston rod 70. All four of the hydraulic cylinder assemblies 64 and 65 are double acting and all are connected in parallel.

When it is desired to swing the upper frame section 12 from the inclined operative position shown in FIGURE 4 to the horizontal inoperative position shown in FIGURE 6, hydraulic fluid is admitted to each of the four power cylinder assemblies 64 and 65 to cause them to project their respective piston rods 70 and 71. The yoke construction provided by the arms 63 fixed to the pivot shaft 13 insures that the cylinder assemblies 64 operate in unison, and that the cylinder assemblies 65 operate in unison. Either pair of cylinder assemblies may operate first or they may operate at the same time. Assuming that the upper pair 65 operates first, the parts take the position as shown in FIGURE 5 when the piston rods 71 are fully extended. Subsequent extension of the piston rods 70 brings the parts to the inoperative position shown in FIGURE 6.

The upper frame section 12 may be returned to its operative position by reversing the flow of hydraulic fluid to the cylinder assemblies 64 and 65, so that the piston rods 70 and 71 are retracted.

Having fully described my invention, it is to be understood that I am not to be limited to the details herein set forth, but that my invention is of the full scope of the appended claims.

I claim:

1. In a folding conveyor, the combination of: first and second frame sections pivotally connected end-to-end, an endless conveyor member mounted to travel on said frame sections, fluid pressure power means effecting relative swinging movement of said frame section about their pivotal connection, said power means including first and second power cylinder assemblies, each having a pair of relatively movable parts, means pivotally connecting one part of each of said cylinder assemblies to one of said frame sections, respectively, pivot means connecting the other part of one cylinder assembly to the other part of the other cylinder assembly, and a member constraining said pivot means to a predetermined path relative to at least one of said frame sections.

2. In a folding conveyor, the combination of: first and second frame sections pivotally connected end-to-end, an endless conveyor member mounted to travel on said frame sections, power means for swinging said second frame section about its pivotal connection with said first frame section, said power means including first and second power cylinder assemblies, each having a pair of relatively movable parts, means pivotally connecting one part of each of said cylinder assemblies to one of said frame sections, respectively, pivot means connecting the other part of one cylinder assembly to the other part of the other cylinder assembly, and a member pivotally connecting said pivot means to at least one of said frame sections.

3. In a folding conveyor, the combination of: first and second frame sections pivotally connected end-to-end, an endless conveyor member mounted to travel on said frame sections, power means for swinging said second frame section about its pivotal connection with said first frame section, said power means including first and second power cylinder assemblies, each having a housing and a relatively movable piston rod, means pivotally connecting the housing of each of said cylinder assemblies to one of said frame sections, respectively, pivot means connecting the piston rod of one cylinder assembly to the piston rod of the other cylinder assembly, and a member constraining said pivot means to a predetermined path relative to at least one of said frame sections.

4. In a folding conveyor, the combination of: first and second frame sections, first pivot means connecting said frame sections end-to-end, an endless conveyor member, mounted to travel on said frame sections, hydraulic power means for swinging said second frame section relative to said first frame section about said first pivot means, said hydraulic power means including first and second power cylinder assemblies, each having a pair of relatively movable parts, means pivotally connecting one part of each of said cylinder assemblies to one of said frame sections, respectively, second pivot means connecting the other part of one cylinder assembly to the other part of the other cylinder assembly, and an arm connecting said first and second pivot means.

5. In a folding conveyor, the combination of: a first frame section, a second frame section, an endless conveyor member mounted to travel on said frame sections, means including a pivot shaft connecting said frame sections end-to-end, hydraulic power means including a first power cylinder assembly pivotally mounted on said first frame section and a second power cylinder assembly pivotally mounted on said second frame section, each power cylinder assembly having relatively extensible piston rods, pivot means connecting the piston rods of each power cylinder assembly, and an arm connecting said pivot means to said pivot shaft, whereby said second frame section may be swung relative to said first frame section by said hydraulic power means.

6. In a folding conveyor, the combination of: first and second frame sections, means including a pivot shaft connecting said frame sections end-to-end, an endless conveyor member mounted to travel on said frame sections, power means for swinging said second frame section about the pivot shaft, said power means including a first pair and a second pair of power cylinder assemblies, each cylinder assembly having two relatively movable parts, means pivotally connecting one part of each pair of said cylinder assemblies to one of said frame sections, respectively, pivot means connecting the other part of one pair of cylinder assemblies to the other part of the other pair of cylinder assemblies, respectively, and a member constraining said pivot means to a predetermined path relative to at least one of said frame sections.

7. In a folding conveyor, the combination of: first and second frame sections, means including a pivot shaft connecting said frame sections end-to-end, an endless conveyor member mounted to travel on said frame sections, power means for swinging said second frame section about the pivot shaft, said power means including a first pair and a second pair of power cylinder assemblies, each cylinder assembly having two relatively movable parts, means pivotally connecting one part of each pair of said cylinder assemblies to one of said frame sections, respectively, pivot means connecting the other part of one pair of cylinder assemblies to the other part of the other pair of cylinder assemblies, respectively, and arms connecting said pivot means to said pivot shaft.

8. In a folding conveyor, the combination of: first and second frame sections, means including a pivot shaft connecting said frame sections end-to-end, an endless conveyor member mounted to travel on said frame sections, power means for swinging said second frame section about the pivot shaft, said power means including a first pair and a second pair of power cylinder assemblies, the first pair being pivotally mounted on opposite sides of the first frame section and the second pair being pivotally mounted on opposite sides of the second frame section, each power cylinder assembly having an extensible part, pivot means connecting the extensible part of each power cylinder assembly of the first pair to the extensible part of a power cylinder assembly of the second pair, respectively, and a pair of arms fixed to said pivot shaft and connected to said pivot means.

9. In a folding conveyor, the combination of: an inclined frame including first and second frame sections, means including a pivot shaft connecting said frame sections end-to-end, an endless conveyor member mounted to travel on said frame sections, the first frame section being adapted for connection to a mobile support, power means for swinging said second frame section about the pivot shaft to an inoperative horizontal position above said first frame section, said power means including first and second pairs of power cylinder assemblies, the first pair being pivotally mounted on opposite sides of the first frame section and the second pair being pivotally mounted on opposite sides of the second frame section, each power cylinder assembly having an extensible part, pivot pins connecting the extensible part of each power cylinder assembly of the first pair to the extensible part of a power cylinder assembly of the second pair, respectively, and a pair of arms on opposite ends of said pivot shaft, each connected to one of said pivot pins.

References Cited in the file of this patent

UNITED STATES PATENTS

| | | |
|---|---|---|
| 785,241 | Ulrich | Mar. 21, 1905 |
| 2,812,867 | Anderson | Nov. 12, 1957 |